United States Patent
Arens et al.

(10) Patent No.: US 9,388,941 B2
(45) Date of Patent: Jul. 12, 2016

(54) COMPACT LUBRICANT INJECTOR AND INJECTOR SYSTEM

(75) Inventors: Thomas M. Arens, Florissant, MO (US); Paul G. Conley, St. Charles, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 168 days.

(21) Appl. No.: 13/274,432

(22) Filed: Oct. 17, 2011

(65) Prior Publication Data

US 2013/0092475 A1 Apr. 18, 2013

(51) Int. Cl.
*F16N 27/00* (2006.01)

(52) U.S. Cl.
CPC ...................................... *F16N 27/00* (2013.01)

(58) Field of Classification Search
CPC ........................................................ F16N 27/00
USPC ............................................................. 184/7.4
See application file for complete search history.

(56) References Cited

U.S. PATENT DOCUMENTS

| | | | | |
|---|---|---|---|---|
| 1,640,842 A | * | 8/1927 | Loomis | 137/501 |
| 2,005,166 A | | 6/1935 | Roberts | |
| 2,105,577 A | * | 1/1938 | Acker | 184/7.4 |
| 2,448,583 A | | 3/1945 | Fox | |
| 2,627,320 A | | 2/1953 | Rotter | |
| 2,667,236 A | * | 1/1954 | Graves | 184/7.4 |
| 2,684,732 A | * | 7/1954 | Harter | 184/7.4 |
| 2,719,603 A | * | 10/1955 | Le Clair | 184/7.4 |
| 2,867,481 A | | 1/1959 | Hornbostel | |
| 2,996,147 A | * | 8/1961 | Callahan | 184/7.4 |
| 3,025,559 A | | 3/1962 | Basinger | |
| 3,171,510 A | * | 3/1965 | Olsen et al. | 184/15.1 |
| 3,220,375 A | * | 11/1965 | Gruber et al. | 116/204 |
| 3,507,359 A | | 4/1970 | Warnock | |
| 3,715,013 A | * | 2/1973 | Lyth et al. | 184/7.4 |
| 3,722,967 A | | 3/1973 | Lewis | |

(Continued)

FOREIGN PATENT DOCUMENTS

| GB | 2205905 A | 12/1988 |
|---|---|---|
| JP | 02080815 A | 3/1990 |

(Continued)

OTHER PUBLICATIONS

International Search Report dated Jan. 7, 2013 for Application No. PCT/US2012/060407, 3 pages.

(Continued)

*Primary Examiner* — Minh Truong
(74) *Attorney, Agent, or Firm* — Senniger Powers LLP

(57) ABSTRACT

A compact lubricant injector is disclosed. The injector includes an injector body having an inlet for lubricant under pressure, an outlet, and a measuring chamber for receiving lubricant from the inlet. A piston is movable in the injector body along a first axis through a stroke in the measuring chamber for the discharge of a measured volume of lubricant from the measuring chamber and thence through the outlet. A valve is movable in the injector body along a second axis different from the first axis. The valve is responsive to pressure conditions in the inlet for operation of the injector in a cycles ending in a state for venting the injector to effect recharging of the measuring chamber involving the transmission of lubricant from the inlet to the measuring chamber. A combination of at least one such lubricant injector and a manifold is also disclosed.

16 Claims, 16 Drawing Sheets

(56) References Cited

U.S. PATENT DOCUMENTS

| | | | |
|---|---|---|---|
| 3,951,480 A | 4/1976 | Nicholson | |
| 3,958,725 A | 5/1976 | Reeve | |
| 4,027,744 A * | 6/1977 | Kuhnelt et al. | 184/7.4 |
| 4,520,902 A * | 6/1985 | Snow | 184/7.4 |
| 4,572,331 A | 2/1986 | Powell et al. | |
| 4,759,427 A | 7/1988 | Onose | |
| 5,038,892 A | 8/1991 | Maloney | |
| 5,126,722 A | 6/1992 | Kamis | |
| 5,147,016 A * | 9/1992 | Antila | 184/7.4 |
| 5,293,959 A | 3/1994 | Kimberlin | |
| 5,626,467 A | 5/1997 | Cantley | |
| 5,772,085 A | 6/1998 | Bryant et al. | |
| 6,244,387 B1 | 6/2001 | Paluncic et al. | |
| 6,322,336 B1 | 11/2001 | Huss | |
| 6,705,432 B2 | 3/2004 | Conley et al. | |
| 6,863,157 B2 | 3/2005 | Conley et al. | |
| 8,206,135 B2 * | 6/2012 | Wang | 417/466 |
| 2002/0144865 A1 | 10/2002 | Clancy et al. | |
| 2002/0157901 A1 | 10/2002 | Kast et al. | |
| 2003/0039561 A1 | 2/2003 | Batten et al. | |
| 2005/0180870 A1 | 8/2005 | Stanley et al. | |
| 2006/0213725 A1 * | 9/2006 | Czempisz et al. | 184/7.4 |
| 2007/0177835 A1 | 8/2007 | Verhaegen | |
| 2009/0148088 A1 | 6/2009 | Sasabe et al. | |
| 2010/0038178 A1 | 2/2010 | Paluncic et al. | |
| 2010/0206667 A1 | 8/2010 | Paluncic et al. | |

FOREIGN PATENT DOCUMENTS

| | | |
|---|---|---|
| JP | 02195020 A | 8/1990 |
| JP | 2007024256 | 2/2007 |

OTHER PUBLICATIONS

Written Opinion dated Jan. 7, 2013 for Application No. PCT/US2012/060407, 5 pages.

European Search Report in corresponding application No. PCT/US2012/060407 dated Mar. 19, 2015.

* cited by examiner

US 9,388,941 B2

COMPACT LUBRICANT INJECTOR AND INJECTOR SYSTEM

FIELD OF THE INVENTION

The present invention generally relates to lubrication equipment, and more particularly to a lubricant injector for delivering lubricant to a bearing or other location requiring lubrication.

BACKGROUND OF THE INVENTION

This invention relates to the type of lubricant injector described in U.S. Pat. No. 6,705,432, assigned to Lincoln Industrial Corporation of St. Louis, Mo. and incorporated herein by reference. While the lubricant injector systems described in this application are commercially successful, there is a need for a more compact design.

SUMMARY OF THE INVENTION

In general, this invention is directed to compact lubricant injector. The injector comprises an injector body having an inlet for lubricant under pressure, an outlet, and a measuring chamber for receiving lubricant from the inlet. A piston is movable in the injector body along a first axis through a stroke in the measuring chamber for the discharge of a measured volume of lubricant from the measuring chamber and thence through the outlet, and a valve is movable in the injector body along a second axis different from the first axis. The valve is responsive to pressure conditions in the inlet for operation of the injector in cycles in each of which the injector starts in a state of repose wherein pressure of lubricant in the inlet is relieved and the measuring chamber is charged with lubricant, progresses through a state of discharge wherein lubricant under pressure is delivered to the injector via the inlet for the discharge, and ends in a state for venting the injector to effect recharging of the measuring chamber involving the transmission of lubricant from the inlet to the measuring chamber.

The invention is also directed to a lubricant injector system comprising an injector as described above in combination with a manifold.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
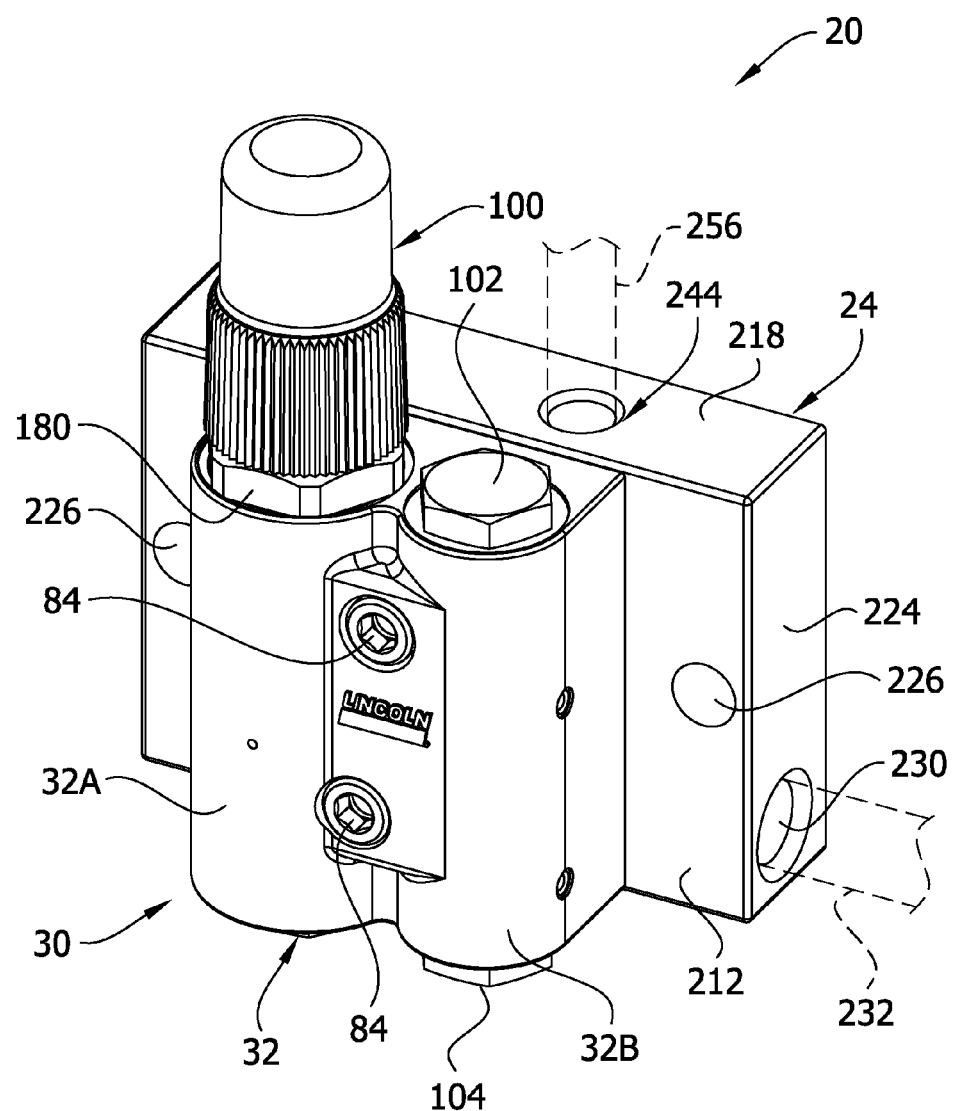
FIG. 1 is a perspective of a compact lubricant injector system comprising an injector of this invention mounted on a manifold.

FIG. 1 illustrates a compact lubricant injector system of this invention, generally designated 20. The system comprises a manifold 24 and at least one compact injector, generally designated 30, mounted on the manifold. The number of injectors mounted on the manifold can vary from one to two or more. Alternatively, the manifold can be eliminated and one or more injectors can be used individually.

Figure 3:
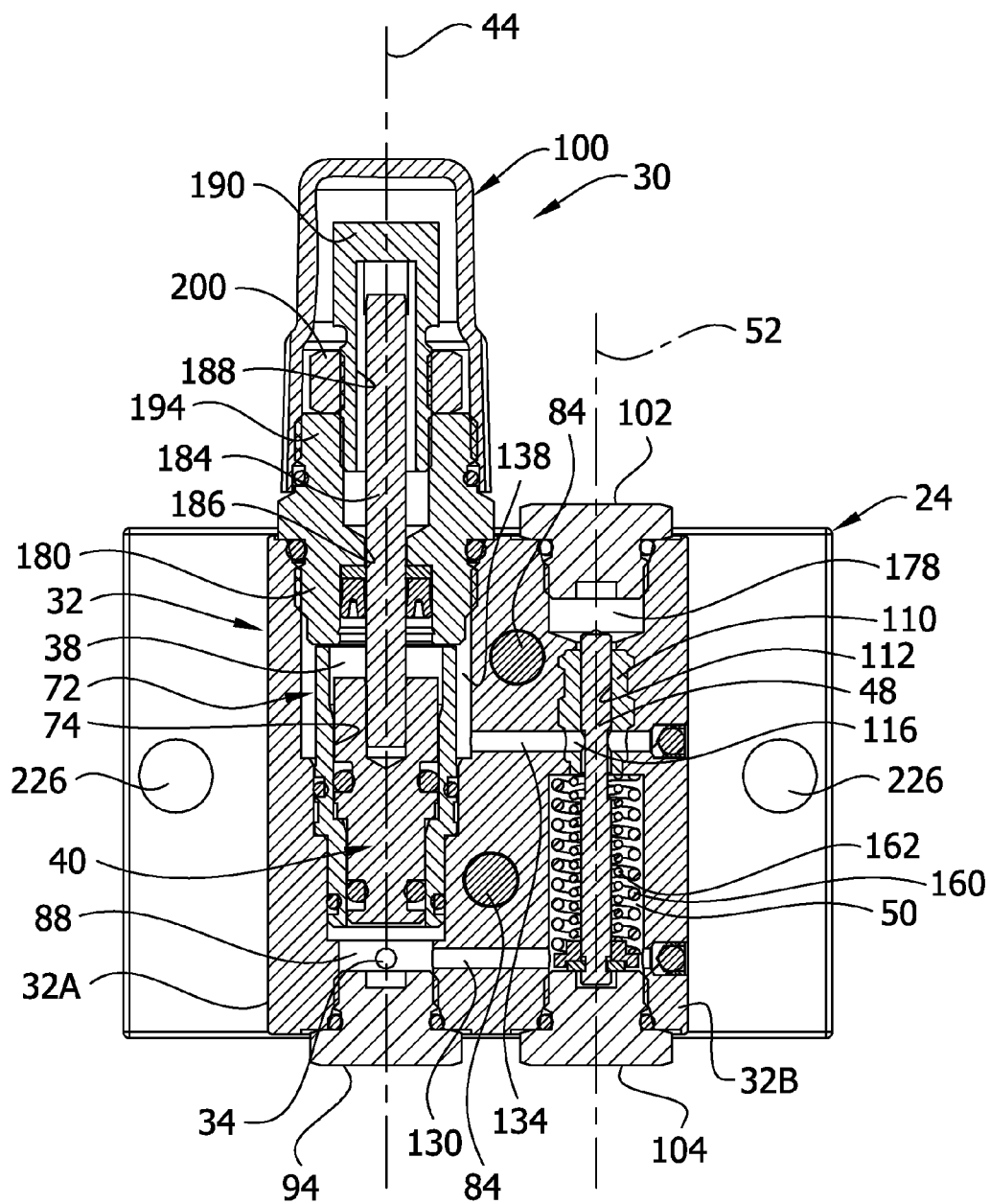
FIG. 3 is a vertical section taken in the plane of 3-3 of FIG. 2.
Figure 4:
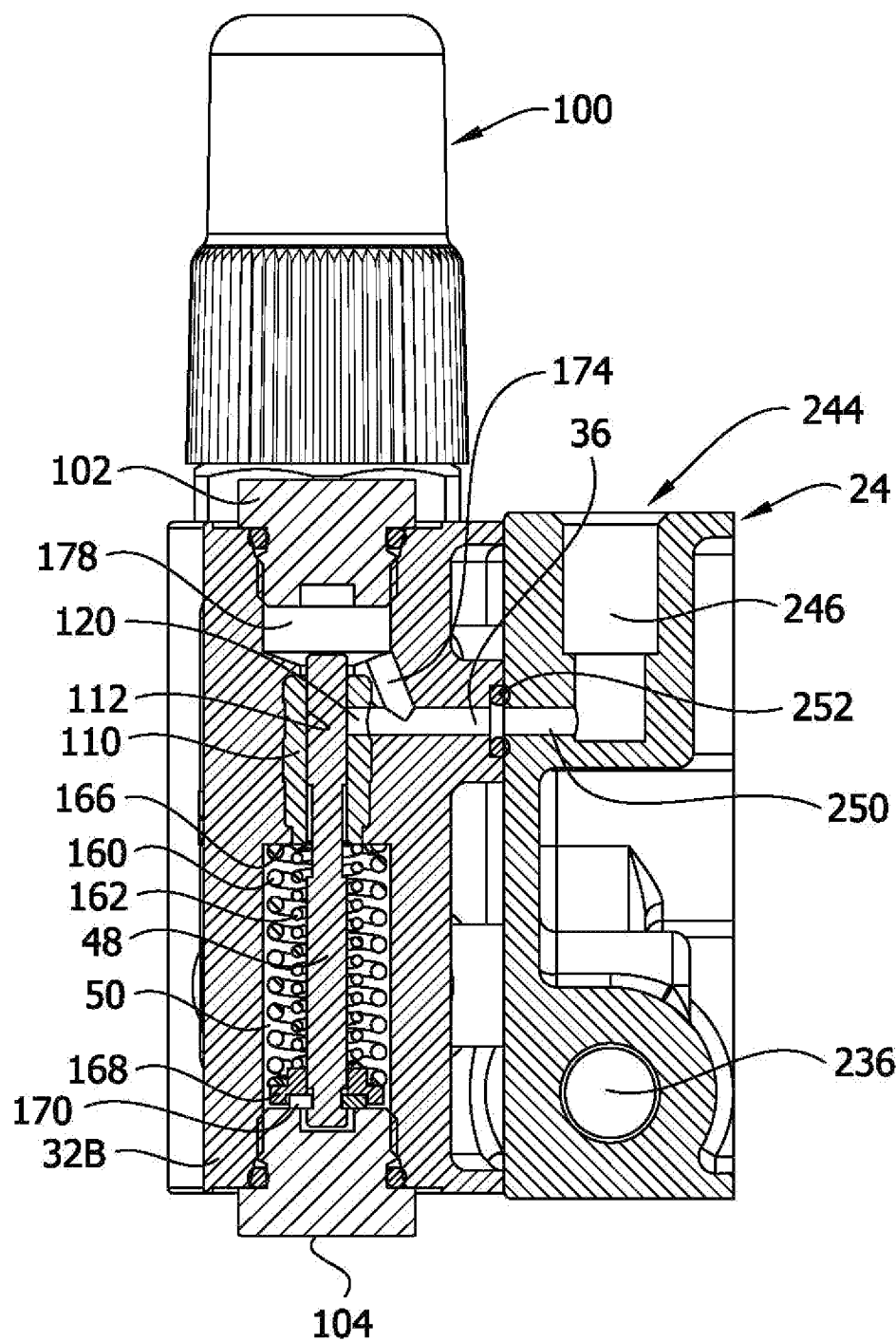
FIG. 4 is a vertical section taken in the plane of 4-4 of FIG. 2.

In general, as best illustrated in FIGS. 3 and 4, each injector 30 comprises an injector body 32 having an inlet 34 for receiving lubricant (e.g., grease or oil) under pressure, an outlet 36, and a measuring chamber 38 for receiving lubricant from the inlet. A piston 40 is movable in the injector body 32 along a first axis 44 through a stroke for the discharge of a measured volume of lubricant from the measuring chamber 38 and thence through the outlet 36. A valve 48 is movable in a valve passage 50 in the injector body 32 along a second axis 52 different from the first axis 44. In the illustrated embodiment, the second axis 52 is generally parallel to and spaced laterally from the first axis 44. This arrangement provides a more compact design than in the prior design of U.S. Pat. No. 6,705,432 in which the piston and valve are positioned end-to-end instead of side-by-side. Other arrangements providing a more compact design are possible (e.g., non-parallel axes positioned side-by-side).

As described hereinafter, the valve 48 is responsive to pressure conditions in the inlet 34 for operation of the injector 30 in cycles in each of which the injector starts in a state of repose wherein pressure of lubricant in the inlet is relieved and the measuring chamber 38 is charged with lubricant, progresses through a state of discharge wherein lubricant under pressure is delivered to the injector via the inlet 34 for the discharge, and ends in a state for venting the injector to effect recharging of the measuring chamber involving the transmission of lubricant from the inlet to the measuring chamber 38. In this general sense, the operation of the injector 30 is the same as the injector described in the aforementioned U.S. Pat. No. 6,705,432.

Figure 6:
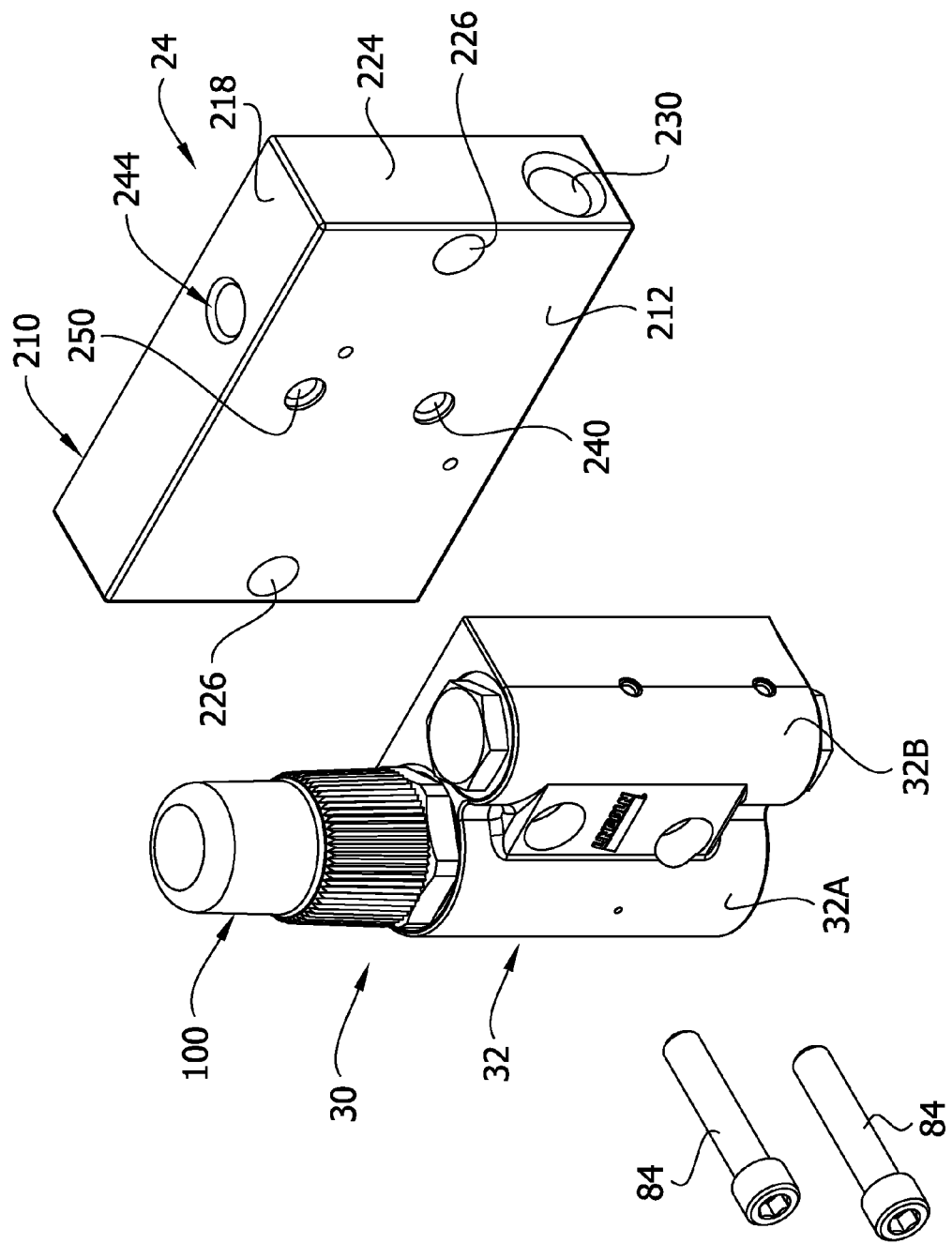
FIG. 6 is an exploded perspective showing the injector and fasteners exploded away from the manifold.
Figure 7:
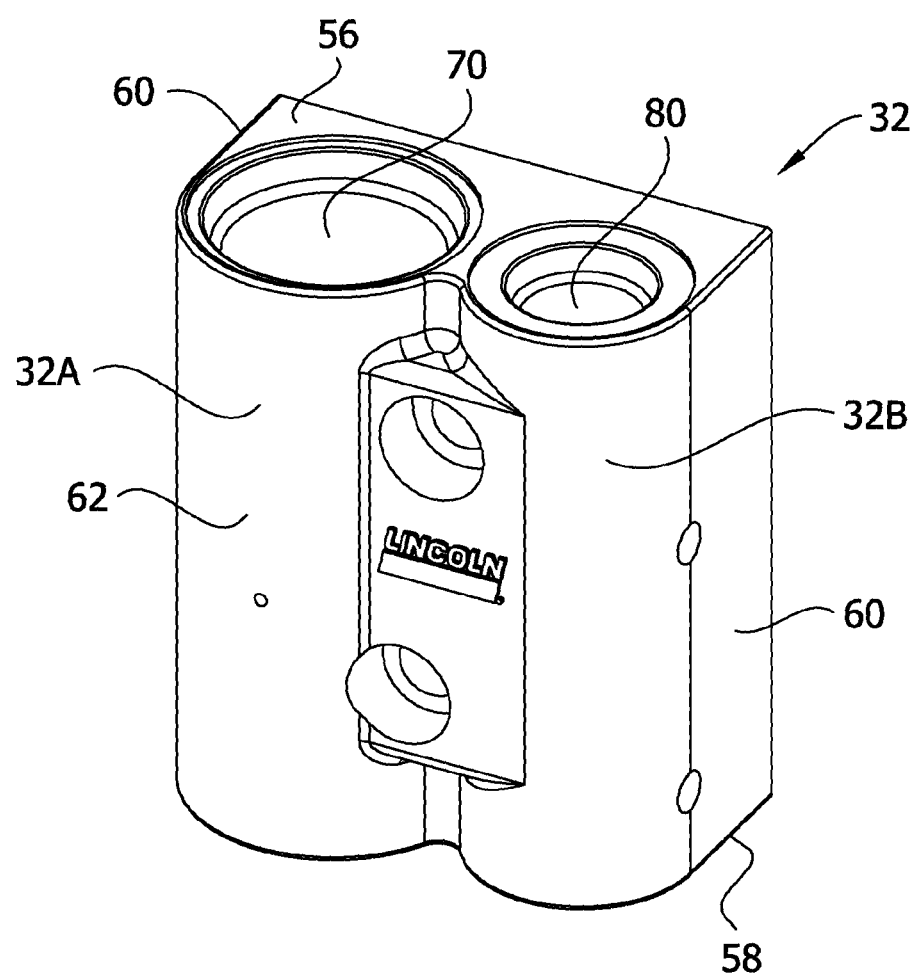
FIG. 7 is a front perspective of a one-piece injector body of the injector.
Figure 8:
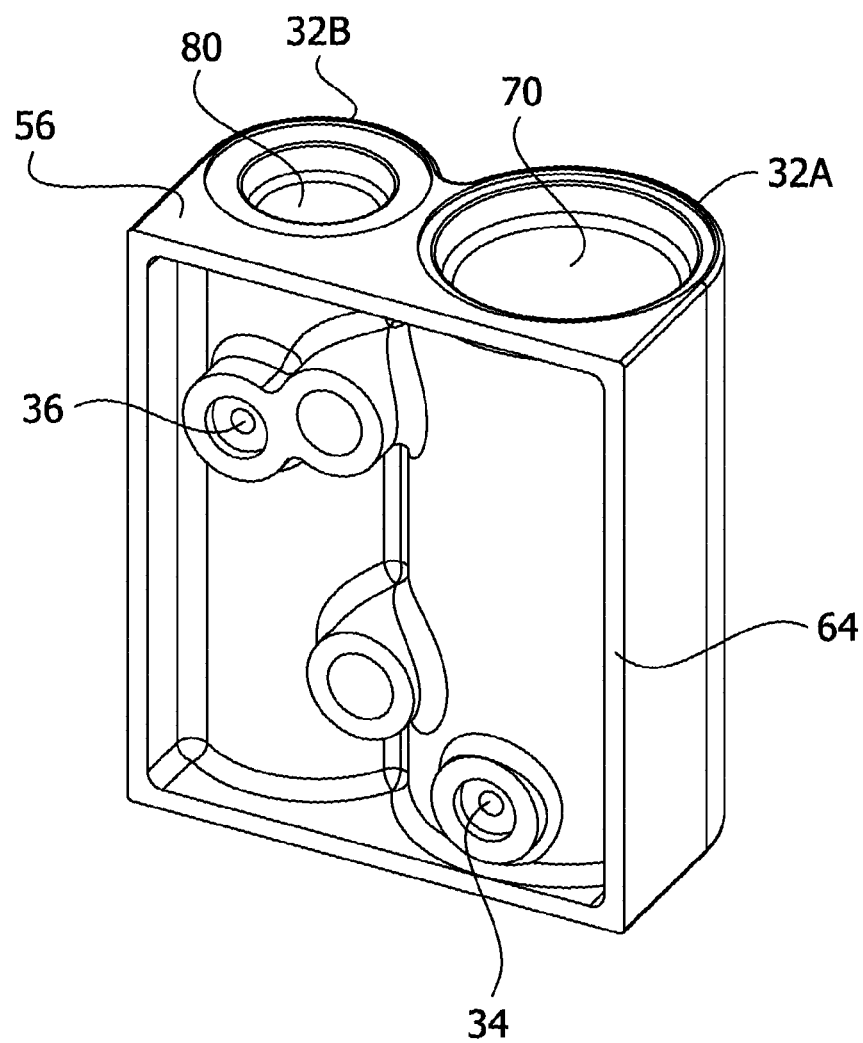
FIG. 8 is a rear perspective of the one-piece injector body.

Desirably, the injector body 32 is formed as an integral, one-piece member, as by a near-net-shape manufacturing process to minimize the amount of material needed to make the member. Alternatively, the injector body 32 may be formed as two or more separate parts. As illustrated in FIGS. 6-8, the body 32 has a top 56, a bottom 58, opposite sides 60, a curved front face 62, and a back face 64. Functionally, the injector body 32 comprises first and second injector portions 32A, 32B positioned side-by-side. The first injector portion 32A has a first cavity 70 containing a cylinder 72 defining a cylinder bore 74 (see FIG. 3). The piston 40 reciprocates in the cylinder bore 74 along the first axis 44. The second injector portion 32B has a second cavity 80 defining the valve passage 50. The injector body 32 is attached to the manifold 24 by fasteners 84 (e.g., screws). The use of such fasteners allows an injector 30 to be removed from the manifold 24 for repair and/or replacement. However, other suitable means may be used for attaching the injector body to the manifold, either in a permanent or removable fashion.

Figure 5:
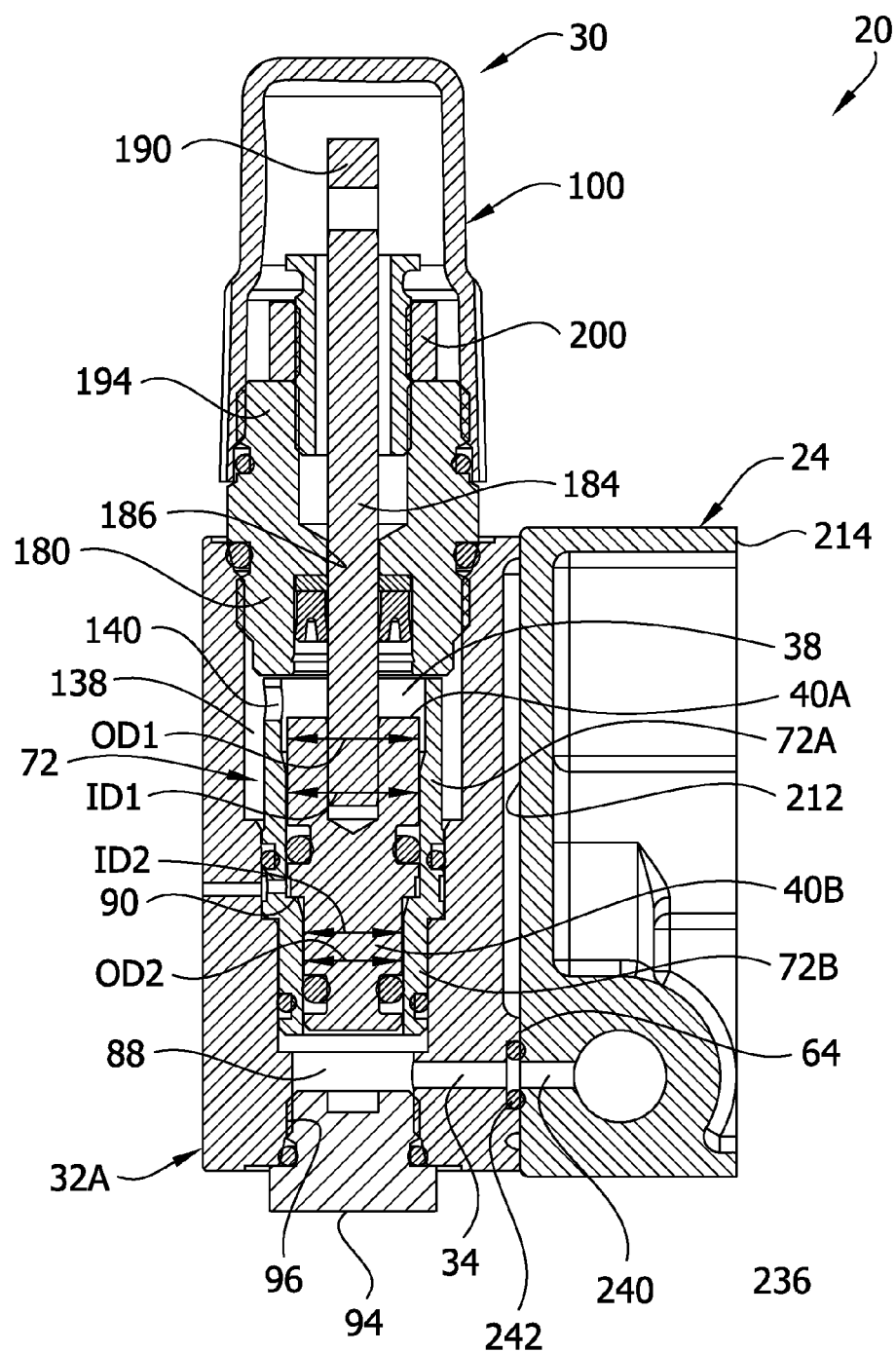
FIG. 5 is a vertical section taken in the plane of 5-5 of FIG. 2.

Referring to FIG. 5, the cylinder 72 is a differential cylinder having a first (upper) section 72A with an inside diameter ID1 and a second (lower) section 72B having a smaller inside diameter ID2. As illustrated, the cylinder 72 is formed as a part separate from the injector body 32 and having a sealing fit with the injector body 32. However, it will be understood that the cylinder 72 and injector body 32 can be integrally formed as one part.

The piston 40 is a differential piston having a first (upper) section 40A with a an outside diameter OD1 received in the upper section 72A of the cylinder 72 and a second (lower) section 40B with a smaller outside diameter OD2 received in the lower section 72B of the cylinder (FIG. 5). The piston 40 has first (upper) and second (lower) opposite ends, the upper end having a larger surface area than the lower end. The measuring chamber 38 is located adjacent the upper end of the piston 40. The first portion 32A of the injector body 32 defines a pressure chamber 88 located adjacent and below the second (lower) end of the piston 40. The inlet 34 of the injector 30 is in fluid communication with the pressure chamber 88. The piston 40 is movable upward (forward) in the cylinder 72 from a retracted position in which it engages an annular shoulder 90 on the cylinder (FIGS. 5, 13A) and establishes a volume for the measuring chamber, toward an extended position in which it discharges a measured volume of lubricant from the measuring chamber 38 (FIG. 13C). The lower end of the pressure chamber 88 is sealed by a plug 94 threaded in an opening 96 in the first portion 32A of the injector body 32. The upper end of the cylinder bore 74 is sealed by a sealing assembly, generally designated 100.

Figure 11:
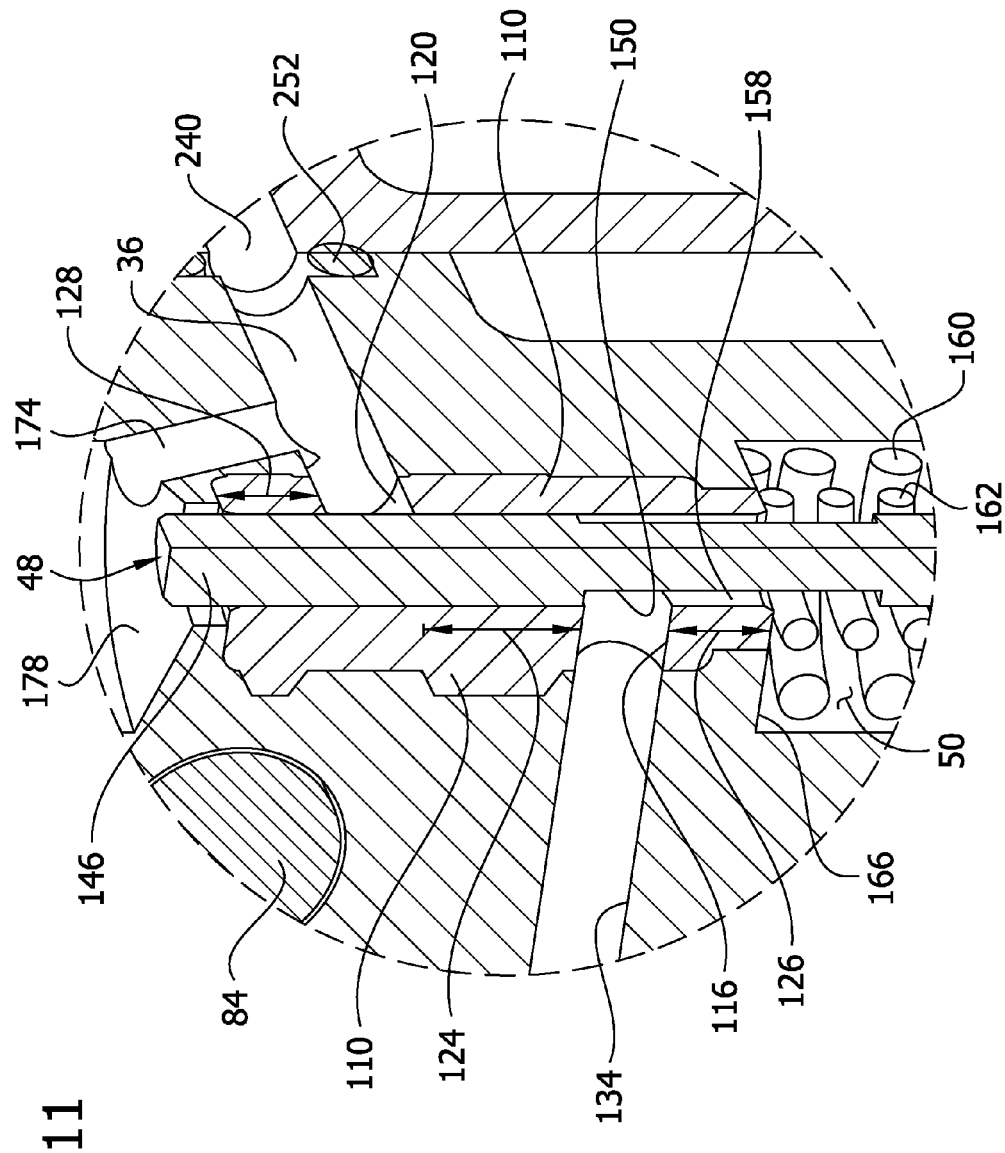
FIG. 11 is an enlarged portion of FIG. 10 illustrating the valve in a first position relative to a valve seat in the injector body.

Referring to FIGS. 3 and 4, the valve passage 50 extends through the second portion 32B of the injector body 32 from the top 56 of the body to the bottom 58 of the body. The valve passage 50 has upper and lower ends sealed closed by upper and lower plugs 102, 104 in threaded engagement with the injector body 32. An elongate generally cylindrical valve seat 110 is positioned in the valve passage 50. A longitudinal bore 112 extends through the valve seat in a direction generally co-axial with the second axis 52. The valve seat 110 has first (lower) and second (upper) lateral bores 116, 120 extending from the longitudinal bore 112 to an exterior surface of the valve seat, the lower lateral bore 116 being shown in FIG. 3 and the upper lateral bore 120 being shown in FIG. 4. As shown in FIG. 11, the lateral bores 116, 120 in the valve seat 110 are axially separated by a distance 124. The lower lateral bore 116 is spaced a distance 126 above the lower end of the valve seat, and the upper lateral bore 120 is spaced a distance 128 below the upper end of the valve seat. As illustrated, the valve seat 110 is formed as a part separate from the injector body 32, but it will be understood that the valve seat and injector body could be integrally formed as one part.

As best illustrated in FIG. 3, a first connecting passage 130 in the injector body 32 extends at an angle (e.g., generally perpendicular) relative to the first and second axes 44, 52 and fluidly connects the pressure chamber 88 and the valve passage 50. A second connecting passage 134 in the injector body 32 also extends at an angle (e.g., generally perpendicular) relative to the first and second axes 44, 52 and fluidly connects the valve passage 50 and the measuring chamber 38. In the illustrated embodiment, the second connecting passage 134 fluidly communicates with the measuring chamber 38 via an annular space 138 surrounding the cylinder 72 and by one or more openings 140 in the cylinder 72 (see FIG. 5), and the second connecting passage 134 fluidly communicates with the valve passage 50 via the first (lower) lateral bore 116 in the valve seat 110. The valve passage 50 fluidly communicates with the outlet 36 of the injector 30 via the second (upper) lateral bore 120 in the valve seat 110.

Figure 9:
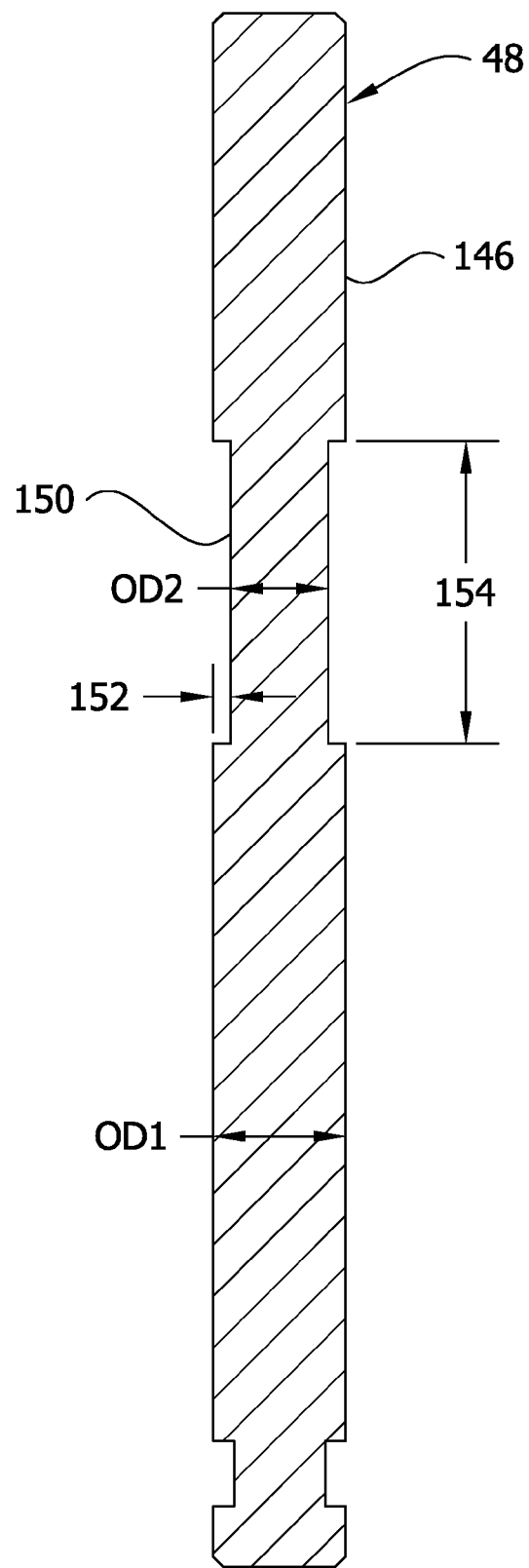
FIG. 9 is an enlarged sectional view of a valve of the injector.

Referring to FIGS. 3 and 9, the valve 48 comprises a cylindrical valve body 146 extending lengthwise of the valve passage 50 through the longitudinal bore 112 in the valve seat 110. The valve body 146 has one (and only one) circumferential groove 150 in its outer surface having a depth 152 and an axial length 154 (FIG. 9). The groove 150 reduces the outside diameter of the valve body 146 from an outside diameter OD1 to a smaller outside diameter OD2. The valve body 146 is sized at OD1 to have a close fit with the valve seat 110 sufficient to block the flow of lubricant. However, the valve body 146 is sized at OD2 to provide a relatively large gap 158 (FIG. 11) in the area of the groove 150 between the valve body 146 and the valve seat 110 sufficient to permit the flow of lubricant past the valve seat. For reasons that will become apparent, the axial length 154 of the groove 150 is greater than a distance 124 separating the first and second lateral bores 116, 120 in the valve seat 110. The axial length 154 of the groove is also greater than the distance 126 separating the lower connecting passage 130 and the lower end of the valve seat 110.

Figure 10:
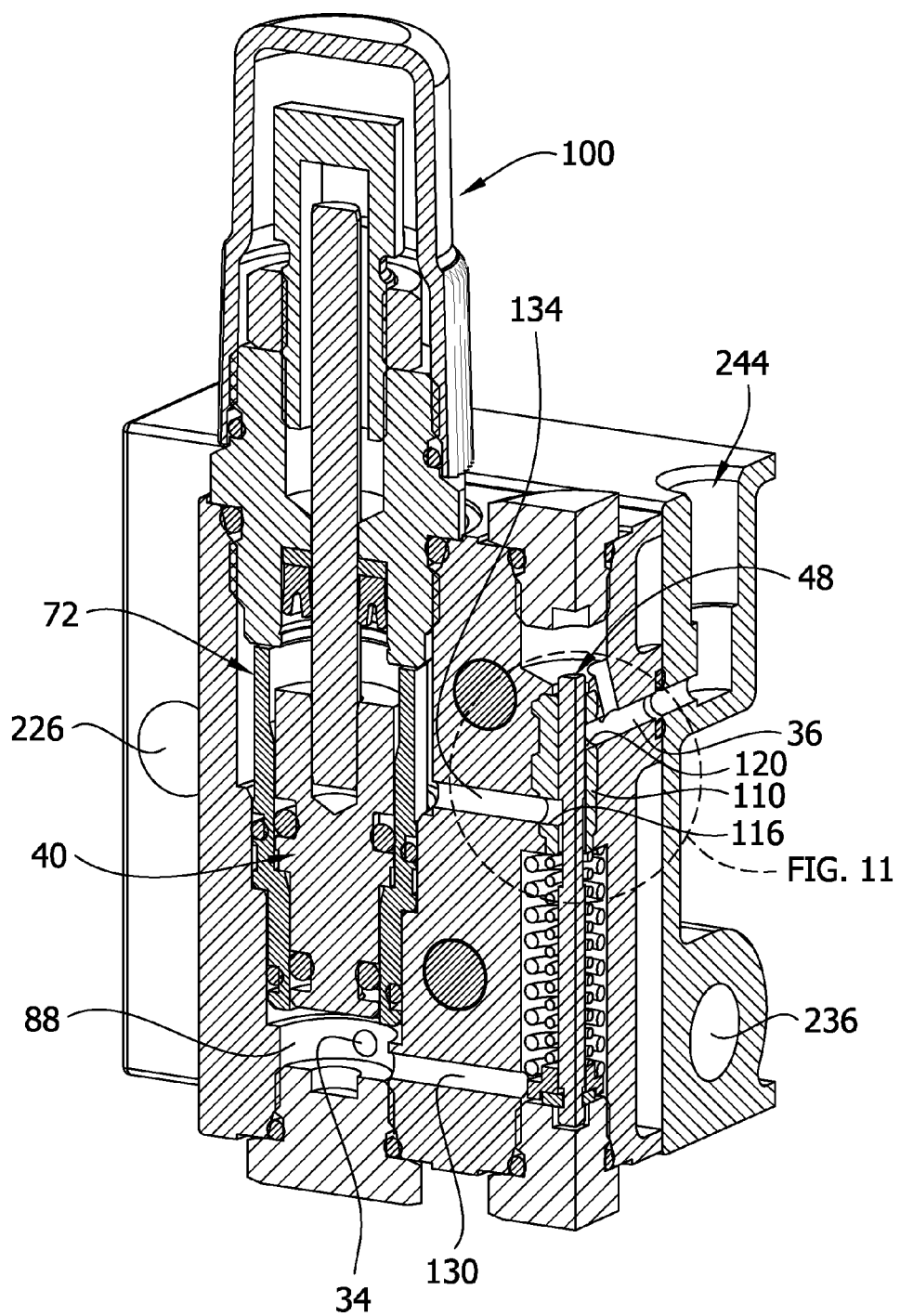
FIG. 10 is a perspective of the injector system of FIG. 1 with portions of the injector and manifold shown in section to illustrate details.
Figure 12:
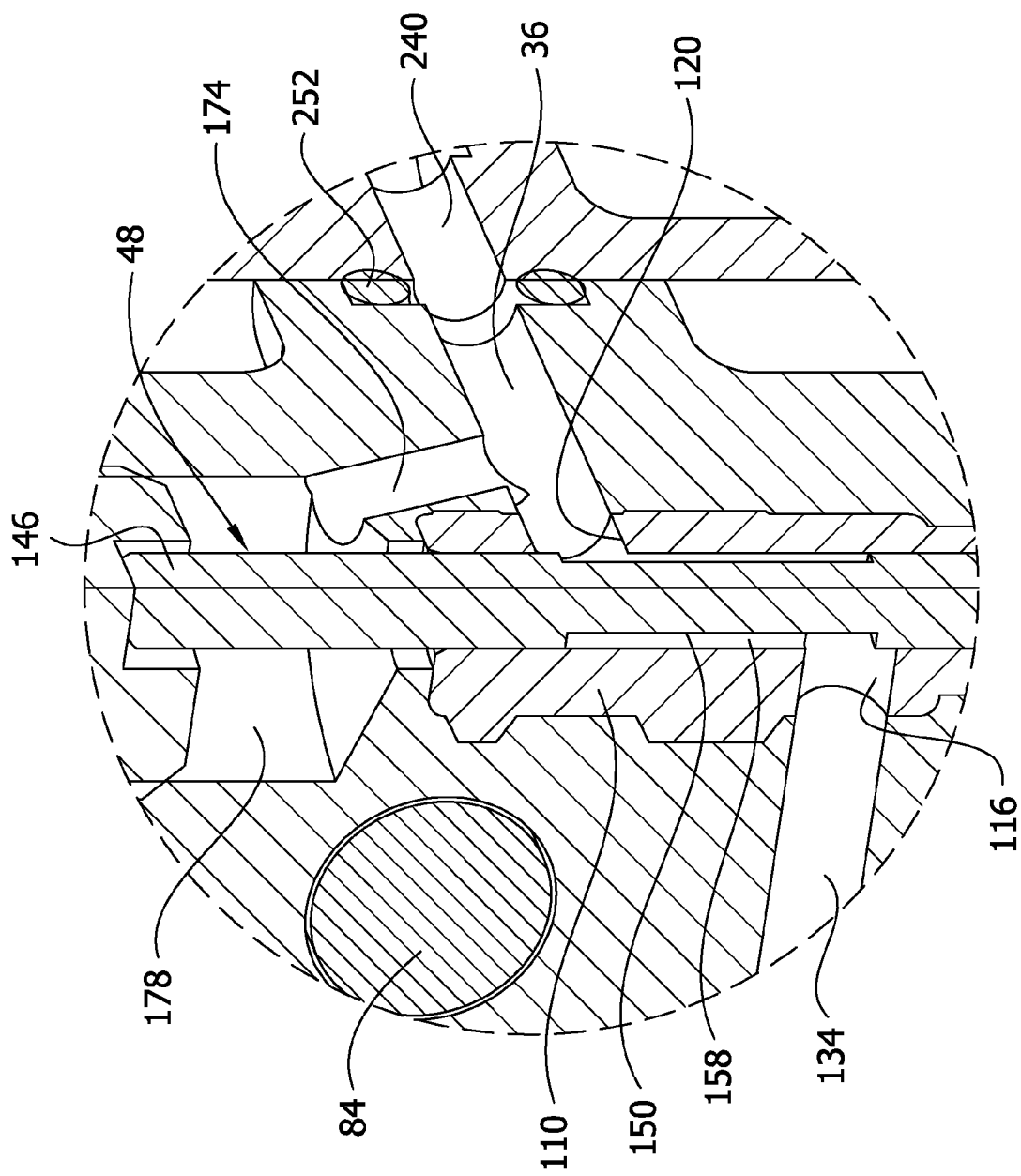
FIG. 12 is a view similar to FIG. 11 but illustrating the valve in a second position relative to the valve seat.

The valve body 146 is movable in the valve passage 50 between a first position when the injector 30 is in its state of repose (e.g., FIGS. 10, 11, 13A) and a second position (FIG. 12, 13C) when the injector is said state of discharge. These positions are described in detail below.

In the stated first position (FIGS. 10, 11, 13A), the body 146 of valve 48 is in a position in which the groove 150 in the valve body fluidly connects the first (lower) lateral bore 116 in the valve seat 110 and the first connecting passage 130, via the lower section of the valve passage 50 below the valve seat. As a result, the valve 48 establishes a first fluid pathway for allowing lubricant to flow between the inlet 34 of the injector 30 and the measuring chamber 38 via the first connecting passage 130, the lower section of the valve passage 50, the gap 158 between valve seat and the valve body in the area of the groove 150, the first (lower) lateral bore 116 in the valve seat, the second connecting passage 134, the annular space 138 around the cylinder 72, and the one or more cylinder openings 140. In the stated first position, the groove 150 in the valve body 146 does not fluidly connect the first lateral bore 116 and the outlet 36 of the injector 30. Instead, the larger outside diameter OD2 of the valve body 146 seals against the valve seat 110 above the first (lower) lateral bore 116 to prevent the flow of lubricant to or from the outlet 36 of the injector.

In the stated second position (FIGS. 12 and 13C), the valve body 146 is in a position in which the groove 150 fluidly connects the first lateral bore 116 to the second lateral bore 120 and the outlet 36 for allowing lubricant to flow between the measuring chamber 38 and the outlet of the injector. As a result, the valve 48 establishes a second fluid pathway different from the stated first fluid pathway for fluid communication between the measuring chamber 38 and the outlet 36 via the one or more cylinder openings 140, the annular space 138 around the cylinder 72, the second connecting passage 134, the first (lower) lateral bore 116 in the valve seat 110, the gap 158 between valve seat and the valve body 146 in the area of the groove 150, and the second (upper) lateral bore 120 in the valve seat. In the stated second position, the groove 150 in the valve body 146 does not fluidly connect the first (lower) lateral bore 116 and the first connecting passage 130 in the injector body 32. Rather, the valve body 146 having the larger outside diameter OD2 seals against the valve seat 110 below the first (lower) lateral bore 116 to prevent the flow of lubricant to or from the inlet 34 of the injector via the first connecting passage 130.

Referring to FIGS. 4 and 11, two co-axial springs 160, 162 in the lower section of the valve passage 50 urge the valve 48 toward its stated first position. The springs 160, 162 react at their upper ends against an internal shoulder 166 in the valve passage 50 and at their lower ends against a spring seat 168 held on the lower end of the valve body 146 by a retaining clip 170.

A vent passage 174 (FIG. 4) connects the outlet 36 of the injector 30 and a chamber 178 at the upper end of the valve passage 50 above the valve seat 110 in communication with atmospheric pressure. The vent passage 174 serves as a vacuum break to facilitate reciprocation of the valve 48 in the valve passage 50.

As shown in FIGS. 3 and 5, the sealing assembly 100 sealing the upper end of the cylinder bore 74 comprises a plug 180 having a threaded connection in the cavity 70 with the first portion 32A of the injector body 32 above the cylinder 72. A pin 184 attached to the upper end of the piston 40 extends from the piston up through an axial opening 186 in the plug 180 and slides in a bore 188 in a stop 190 that is adjustably threaded in an upper tubular extension 194 of the plug. The upper end of the pin 184 is positioned for engagement with the upper end of the stop 190. A lock nut 200 is threaded on the stop. The lock nut 200 can be backed off to allow adjustment of the stop to different vertical positions determining different volumes for dispensing from the measuring chamber 38, and then tightened to maintain the volume setting. Reference may be made to U.S. Pat. No. 6,705,432 for further details regarding this feature.

Figure 2:
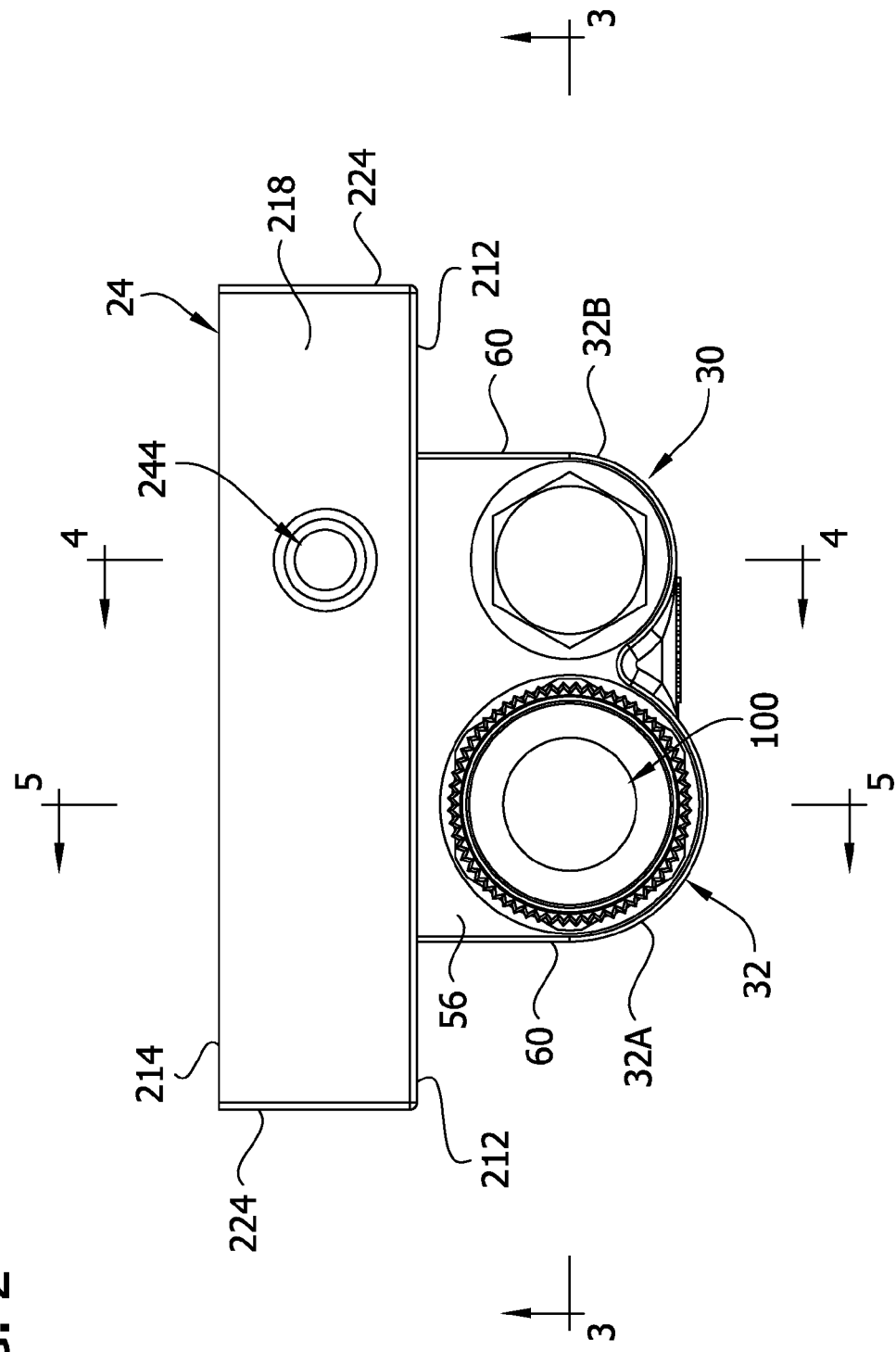
FIG. 2 is a top view of the system.

As shown in FIGS. 2 and 6, the manifold 24 comprises a generally rectangular manifold body 210 having a generally flat, planar front face 212, a back face 214, a top 218, a bottom 220, and opposite ends 224. Desirably, the manifold 24 is formed as an integral, one-piece member, as by a near-net-shape manufacturing process to minimize the amount of material needed to make the member. At least one injector 30 is mounted on the manifold with the back face 64 of the injector body 32 in contact with the front face 212 of the manifold body 210 (see, e.g., FIG. 5). (The number of injectors 30 mounted on the manifold 24 can vary from one to two or more.) The manifold has one or more fastener openings 226 for mounting the manifold on a desired structure.

Referring to FIGS. 1, 4, and 5, the manifold body 210 has lubricant supply passaging therein comprising an inlet 230 threaded for connection to a lubricant supply line 232, a longitudinal passage 236 extending from the inlet 230 along the manifold body, and a lateral passage 240 (one for each injector 30) extending forward from the longitudinal passage to the front face 212 of the manifold body for communication with the inlet 34 of the injector. Only one such lateral passage 240 is shown in the illustrated manifold embodiment, but this number will vary depending on the number of injectors 30. A seal 242 prevents leakage at the interface between each manifold lateral passage 240 and the respective injector inlet 34 (see FIG. 5). The manifold body 210 also has a lubricant outlet 244 for each injector 30 (see FIG. 4). Only one such outlet 244 is shown in the illustrated manifold embodiment, but this number will vary depending on the number of injectors 30. Each outlet 244 comprises an exit bore 246 extending down from the top 218 of the manifold body 210 and a lateral bore 250 extending forward from the exit bore for communication with the outlet 36 of a respective injector 30. A seal 252 prevents leakage at the interface between the lateral bore 250 and the injector outlet 36. The exit bore 246 of each manifold outlet 244 is threaded for attachment to a lubricant line 256 feeding lubricant to one or more points of lubrication, such as one or more bearings (see FIG. 1).

The longitudinal passage 236 in the manifold body 210 extends from one end 224 of the body to the opposite end 224. If the manifold 24 is connected in a supply line, line connections are made at both ends. If the manifold is connected at the end of a supply line, a line connection is made at one end and the other end is plugged.

Figure 13A:
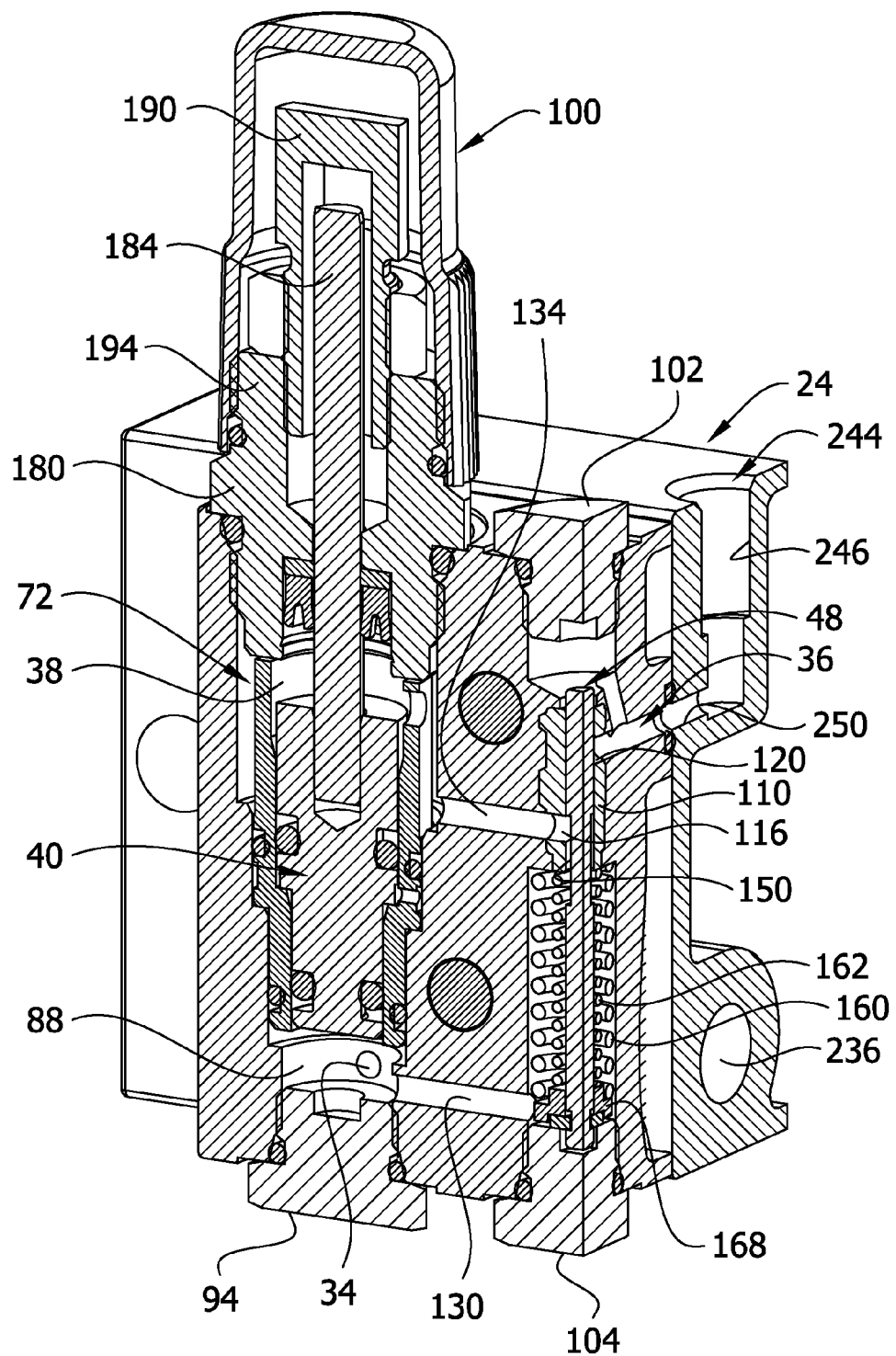
FIGS. 13A-13D are sequential perspective views similar to FIG. 10 illustrating the injector in various states as it moves through a cycle of operation.

FIG. 13A illustrates an injector 30 in its state of repose (i.e., a normal or at rest state), which the injector assumes on venting of the inlet 34. Each injector 30 is in this state at the start of each cycle of operation, with the pressure of lubricant in the inlet of the injector relieved and with the measuring chamber 38 of the injector charged with a metered quantity of lubricant. Although the pressures above and below the piston 40 are substantially equal, the larger surface area at the top end of the piston produces a downward force which keeps the piston at its lower position. The valve 48 is down in its stated first position allowing lubricant to flow along the stated first fluid pathway from the inlet 34 of the injector 30 to the measuring chamber 38.

Figure 13B:
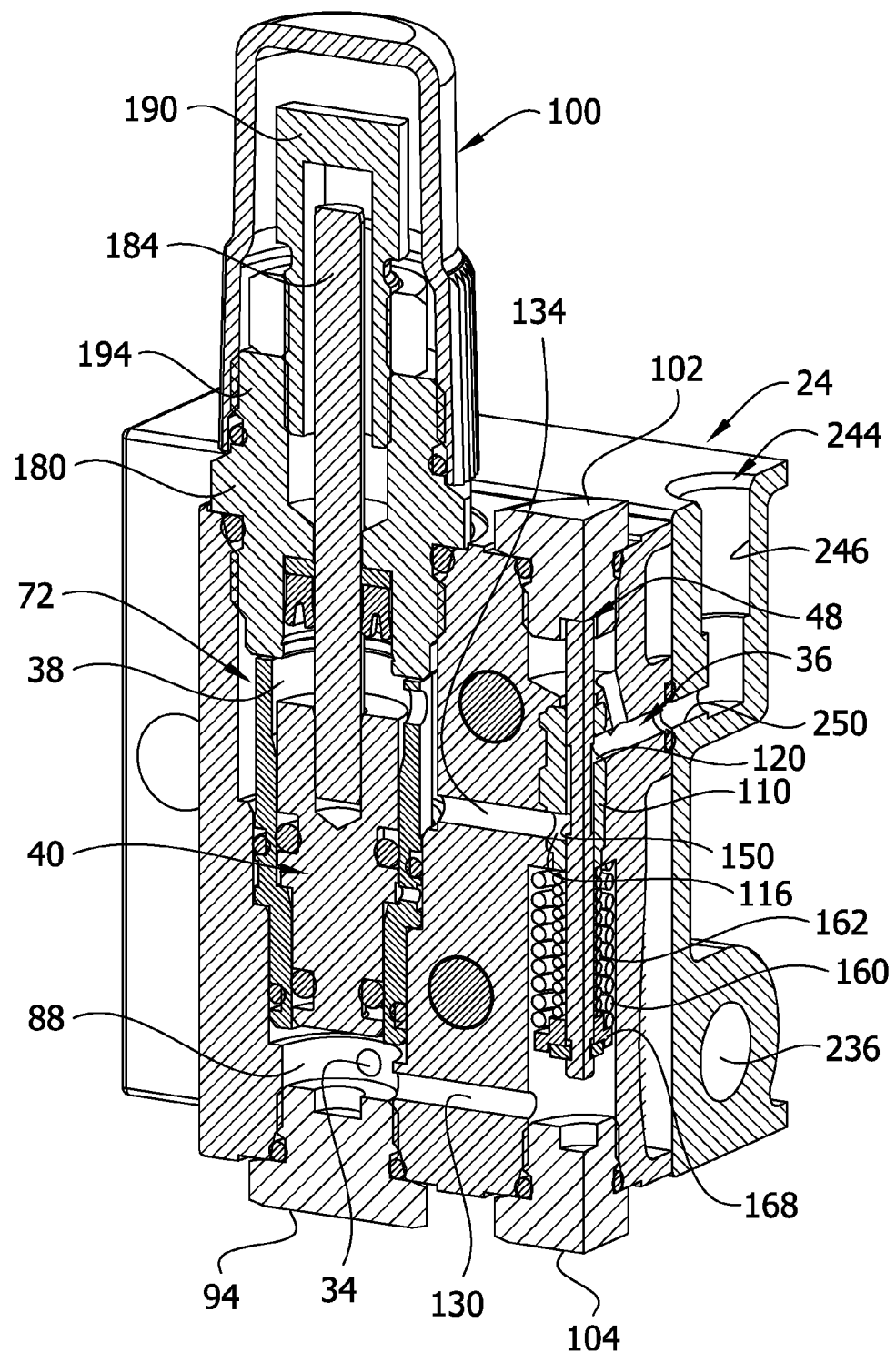
Figure 13C:
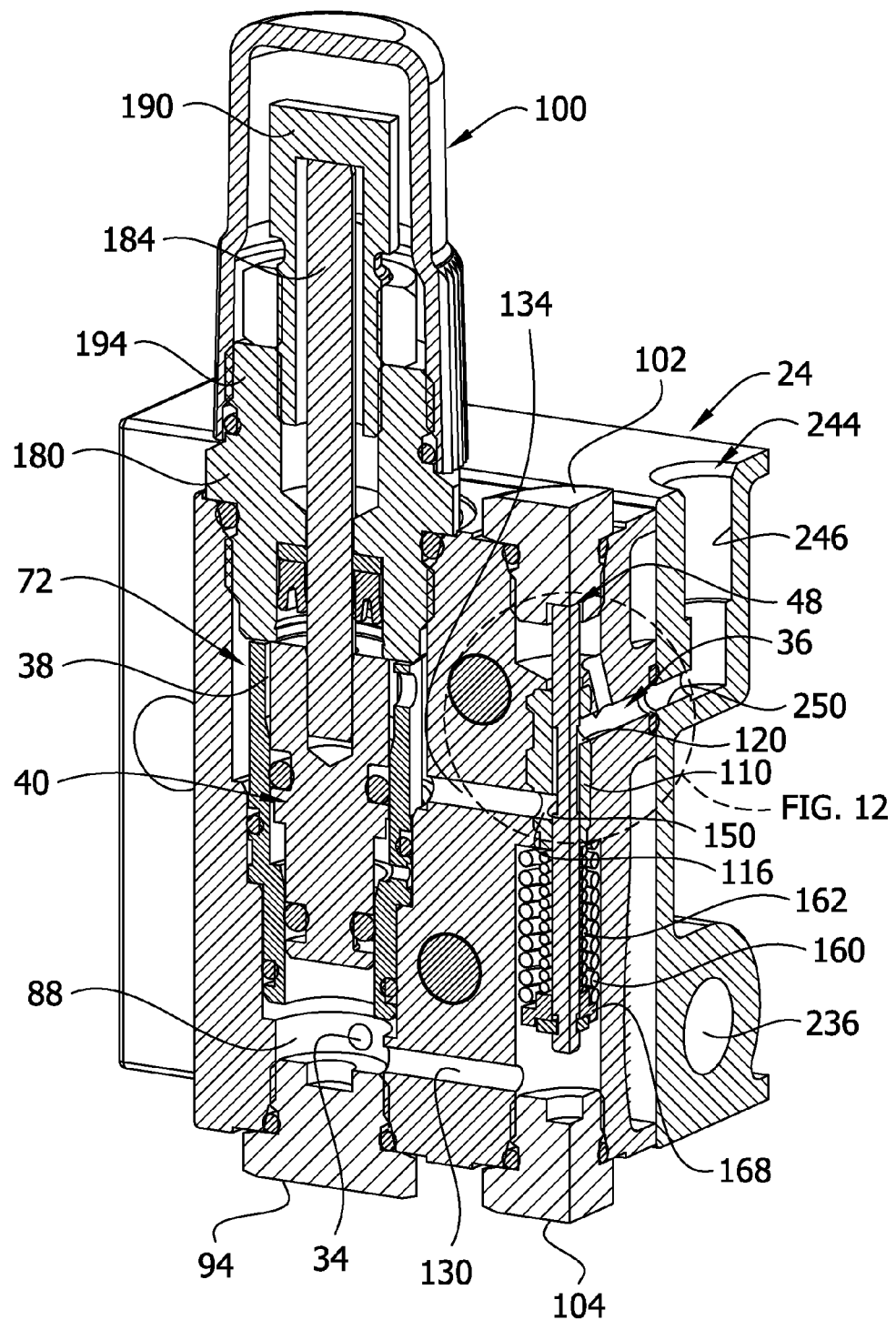

A cycle of operation starts when a pump (not shown) initiates delivery of lubricant under pressure to the inlet 230 of the manifold 24 and from there to the inlet 34 of each injector 30, causing a pressure increase in the pressure chamber. When the pressure reaches a predetermined value (e.g., 1200 psi), the valve 48 moves up against the bias of the springs 160, 162 to its stated second or discharge position to establish the stated second fluid pathway in which the measuring chamber 38 is closed to the inlet 34 and open to the outlet 36 for discharge of lubricant (FIG. 13B). With the valve 48 in this position, the pressure of the incoming lubricant acts only upon the bottom of the piston 40, and the pressure of the discharging lubricant acting on top of the piston begins to decrease, causing the piston to move upward (FIG. 13C).

On the upstroke of the differential piston 40, a measured volume of lubricant is forced out of the measuring chamber 38 along the second fluid pathway and through the outlet 36 of the injector 30 to the outlet 244 of the manifold 24 and then to a respective lubrication location (e.g., a bearing). The volume delivered during discharge is essentially equal to the displacement of the differential piston 40 in stroking upward (as determined by the setting of the stop 190), and may be varied by threading the stop up or down. The pressure at the outlet 36 of the injector 30 during discharge is typically about 70% of the pressure at the inlet 34. By way of example, the pressure at the outlet during discharge may be in the range of 1,800-2,400 psig.

Figure 13D:
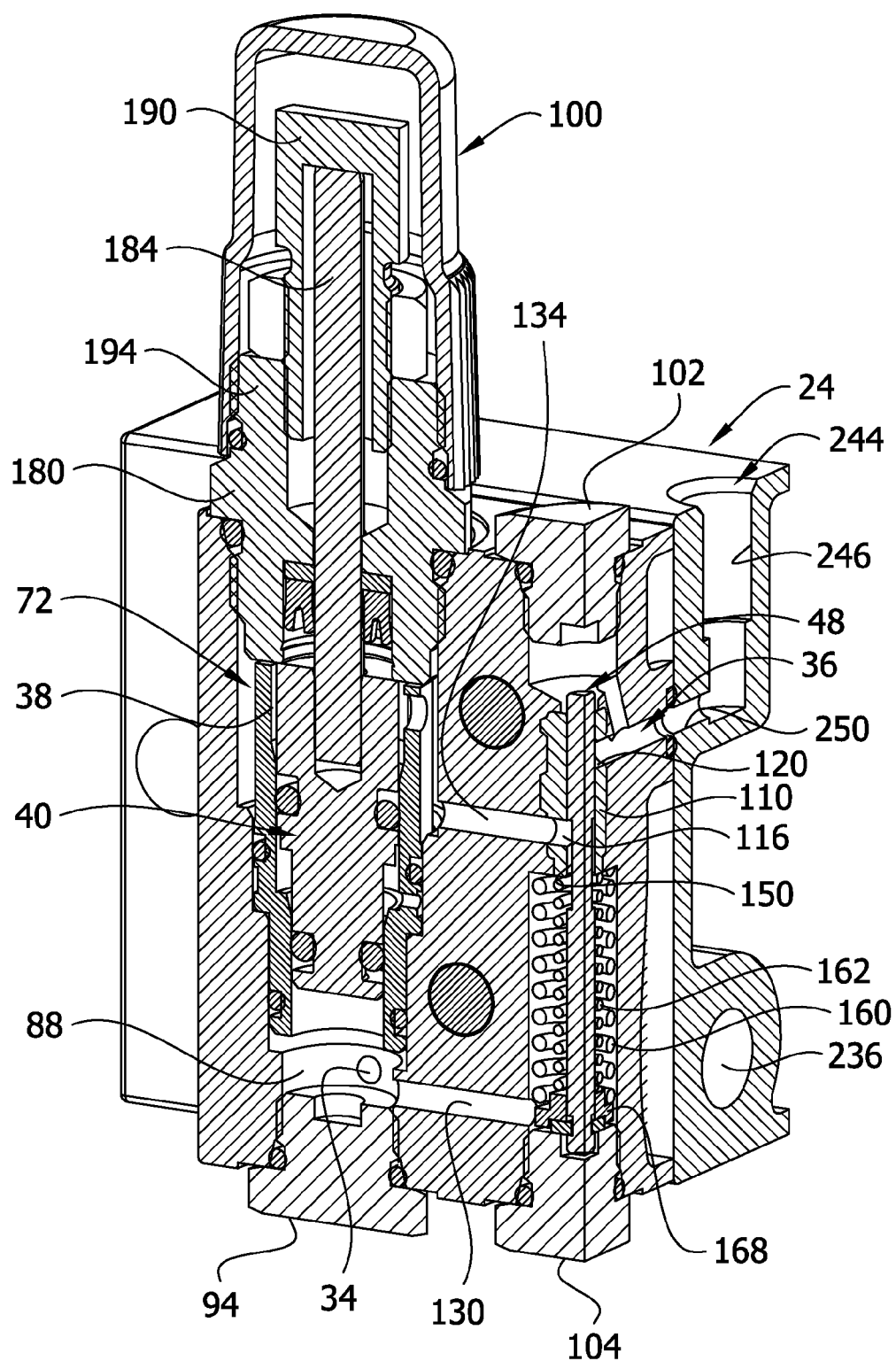

The differential piston 40 and the valve 48 remain in their discharge state until the pump cycles off and lubricant pressure in the lubricant supply line 232 and the manifold 24 is reduced by operation of a valve in or adjacent the pump to vent the supply line, as described in detail in U.S. Pat. No. 6,705,432. As the pressure drops (e.g., to a level below 1200 psig), the valve 48 moves down back to its stated first position (see FIG. 13D), the injector 30 then assuming what is referred to as its state for venting in which the injector is in a venting condition for recharging. The valve 48 is biased back down toward its first position by the springs 160, 162 and any residual backpressure at the injector outlet. The venting pressure (e.g., 1200 psi) of the injector 30 may be controlled by varying the spring force exerted on the valve 48. (Increasing the spring force will increase the venting pressure of the injector; decreasing the force will decrease the venting pressure.) It will be understood that means other than one or more springs can be used to urge the valve 48 toward its stated first position.

When the valve 48 reaches its stated first position (FIG. 13D) in which the first fluid pathway is open and the second fluid pathway is closed, the supply line/manifold pressure at the inlet 34 of the injector 36 acts on both ends of the differential piston 40, causing it to move downward. As the piston moves down, a volume of lubricant flows from the underside of the piston along the first fluid pathway to the upper side of the piston (i.e., the measuring chamber 38). Because the volume on top of the piston 40 is greater than the volume under the piston, the quantity of lubricant in the injector is insufficient to fill the measuring chamber 38 as it expands. As a result, an additional quantity of lubricant is drawn from the manifold 24 and supply line 232 into the injector 30 where it flows from the inlet 34 along the first fluid pathway to the measuring chamber 38 at the upper side of the piston 40. This volume of lubricant leaving the manifold and supply line causes the pressure in the supply line to drop very quickly. At the end of the venting state, the measuring chamber 38 above the piston 40 is full, and the injector is again in its state of repose and ready for the next cycle (FIG. 13A).

Having described the invention in detail, it will be apparent that modifications and variations are possible without departing from the scope of the invention defined in the appended claims. By way of example only, each injector 30 can be used individually without connection to a manifold. In this situation, the lubricant supply line 232 is simply connected to the inlet 36 of the injector (without an intervening manifold), and a lubricant delivery line is connected to the outlet 36 of the injector.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A compact lubricant injector, comprising:
    an injector body having a hollow cylinder extending along a first longitudinal axis between a pressure chamber and a measuring chamber, a valve passage extending along a second longitudinal axis, an inlet to the pressure chamber for delivering pressurized lubricant to the cylinder, a first connecting passage extending from the pressure chamber to the valve passage, a second connecting passage extending between the measuring chamber and a first opening in the valve passage, and an outlet extending from a second opening in the valve passage axially spaced from the first opening;
    a piston positioned in the hollow cylinder of the injector body for reciprocal movement along the first longitudinal axis toward the pressure chamber allowing the measuring chamber to expand for receiving a measured amount of lubricant and away from the pressure chamber causing the measuring chamber to contract for discharging the measured amount of lubricant from the measuring chamber through the second connecting passage; and
    a valve slidably positioned in the valve passage of the injector body for movement along the second longitudinal axis between a filling position, in which the first connecting passage fluidly communicates with the second connecting passage allowing lubricant entering the pressure chamber from the inlet to pass through the valve thereby moving the piston toward the pressure chamber and expanding the measuring chamber to receive the measured amount of lubricant, and a discharging position, in which the second connecting passage fluidly communicates with the outlet allowing lubricant in the measuring chamber to pass through the valve between the second connecting passage and the outlet thereby discharging the measured amount of lubricant through the outlet, the valve moving toward the discharging position under influence of pressurized lubricant from the inlet entering the valve passage through the first connecting passage wherein a first end of the valve is exposed to the lubricant pressure at the inlet; and wherein the injector body has a vent passage, offset from the valve passage, extending from the outlet to the valve passage to expose a second end of the valve, opposite said first end, to atmospheric pressure at the outlet.

2. A compact lubricant injector as set forth in claim 1, wherein:
    said piston has a measuring chamber face partially defining the measuring chamber and a pressure chamber face opposite said measuring chamber face partially defining the pressure chamber; and
    the measuring chamber face has a larger area than the pressure chamber face so the piston tends to move toward the pressure chamber when lubricant pressure in the measuring chamber is equal to lubricant pressure in the pressure chamber.

3. A compact lubricant injector as set forth in claim 2, wherein the valve is biased toward the filling position.

4. A compact lubricant injector as set forth in claim 3, further comprising a spring positioned in the valve passage to bias the valve toward the filling position.

5. A compact lubricant injector as set forth in claim 1, wherein the valve is biased toward the filling position.

6. A compact lubricant injector as set forth in claim 1, further comprising a spring positioned in the valve passage to bias the valve toward the filling position.

7. A compact lubricant injector as set forth in claim 1, further comprising a pair of co-axial springs positioned in the valve passage to bias the valve toward the filling position.

8. A compact lubricant injector as set forth in claim 1, wherein the second longitudinal axis is generally parallel to and spaced laterally from the first longitudinal axis.

9. A compact lubricant injector as set forth in claim 1, wherein the valve has a circumferential groove fluidly connecting the first connecting passage to the second connecting passage when the valve is in the filling position and fluidly connecting the second connecting passage to the outlet when the valve is in the discharging position.

10. A compact lubricant injector as set forth in claim 9, wherein both the first opening in the valve passage and the second opening in the valve passage are aligned with a valve seat.

11. A compact lubricant injector as set forth in claim 10, wherein the groove in the valve spans the first and second openings in the valve passage when the valve is in the discharging position.

12. A compact lubricant injector as set forth in claim 11, wherein the groove has an axial length greater than a distance separating the first and second openings in the valve seat.

13. A compact lubricant injector as set forth in claim 1, wherein said first connecting passage extends generally parallel to said second connecting passage.

14. A compact lubricant injector as set forth in claim 1, wherein piston travel is limited both when traveling toward the pressure chamber and when traveling away from the pressure chamber.

15. A compact lubricant injector as set forth in claim 14, further comprising a stop for limiting piston travel away from the pressure chamber, a position of the stop being selectively adjustable relative to the injector body.

16. A compact lubricant injector as set forth in claim 1, further comprising a manifold connected to the injector body, the manifold having an inlet passage in fluid communication with the inlet of the valve body and an outlet passage in fluid communication with the outlet of the valve body.

* * * * *